3,600,192
METHOD OF PRODUCING FRIED RICE FOR INSTANT COOKING
Tatsuro Tanaka, Kyoto, and Yoshitaka Sato, Ibaraki-shi, Japan, assignors to Nissin Shokuhin Kaisha Ltd., Takatsuki, Japan
No Drawing. Filed Dec. 22, 1967, Ser. No. 692,634
Int. Cl. A23l 1/10
U.S. Cl. 99—80                                                                                   4 Claims

ABSTRACT OF THE DISCLOSURE

The present invention provides for a method of producing fried rice for instant cooking comprising drying boiled rice until the water content of the rice is between 10–20%, and frying the dried rice for 10–20 seconds at a temperature between 356–428° F. (180–220° C.), thereby dehydrating and swelling the rice.

---

This invention relates to a method of producing fried rice to be served as a meal by instant cooking.

The fried rice produced by prior art methods requires a long cooking time of over 15 minutes to achieve the same state as boiled rice, and the cooked fried rice produced from the prior art methods has a taste inferior to boiled rice.

In accordance with this invention, a new and improved fried rice has been produced which can be cooked in about 3 minutes and served as a meal. The rice produced by the present method has an excellent taste and is comparable in quality to boiled rice.

The method of producing fried rice in accordance with this invention comprises a series of process steps whereby the starch of raw rice is changed into α-starch with enough swelling by boiling, and the said rice is dried by hot air in such a manner that the temperature is gradually increased from 86° F. (30° C.) to 194° F. (90° C.) to prevent cracking of the rice.

When the drying air temperature starts over 140° F. (60° C.), many of the particles of rice are apt to be cracked and broken.

As the water content of the dried rice affects the results of the next process of treating the rice, viz by frying and cooking the same; the boiled rice in the previous treatment (i.e. in the step where the starch is changed into α-starch) must be dried to reduce the water content to 10–20% in order to achieve the best results, as shown in the following table, wherein is recorded some experimental observations in respect to the swelling ratio and cooked state of the rice at various water contents of the dried rice:

| Water content of dried rice, percent | Virtual specific weight of rice [1] | Appearance and taste of rice after cooking |
|---|---|---|
| 40 | 0.45 | Surface is brown color in spots and core of the rice is still hard to eat. |
| 30 | 0.32 | |
| 20 | 0.18 | Surface is cream color and enough swelling without either hard cord or odd smelling. |
| 10 | 0.17 | |
| 7 | 0.26 | Surface is brown color and core is still hard to eat. |

[1] After frying treatment.

NOTE.—Frying treatments are proceeded 15 seconds in 410° F. (210° C.) Virtual specific weight of raw rice is 0.80. Methods of cooking are 3 minutes boiling for 120 grams of fried rice with 180 milliliters of water.

The present invention comprises a frying treatment after the said drying process, where the dried rice having a 10–20% water content (based on the total weight of the rice) is to be fried 10–20 seconds in oil or fat, made from plants or animals, at high temperatures of 356–428° F. (180–220° C.).

In the prior art processes, it has been attempted to produce instant rice by frying washed raw rice, however, this method suffers from a disadvantage in that rice produced by this method has an undesirable brown coloration and the swelling of the rice is very poor. It has also been attempted by prior art processes, to produce instant rice by first boiling the rice and, without drying, to fry the rice for 3–5 minutes at 230–302° F. (110–150° C.). However, the rice produced by this method also has a brown coloration and is also not sufficiently swelled. As a result of the two processes described above, the instant cooking rice produced from these methods must be cooked for a considerable time, i.e. over 15 minutes in order to properly cook the rice and the taste and, of course, the color is accordingly impaired.

The present invention overcomes the above-stated disadvantages of the prior art by gradually drying boiled raw rice by hot air in such a manner that the water content of the rice is reduced to a water content of between about 10–20%, and the subsequent frying of the dried rice at a temperature of 356–428° F. (180–220° C.) in oil for 10–20 seconds.

| Oil temperature ° F. (° C.) | Virtual specific weight | Water content in fried rice, percent | Oil or fat content in fried rice, percent |
|---|---|---|---|
| 302 (150) | 0.54 | 8.32 | 8.2 |
| 320 (160) | 0.42 | 5.02 | 9.5 |
| 338 (170) | 0.35 | 3.83 | 12.3 |
| 356 (180) | 0.21 | 2.78 | 16.5 |
| 374 (190) | 0.20 | 2.07 | 18.2 |
| 392 (200) | 0.18 | 1.93 | 20.0 |
| 410 (210) | 0.18 | 1.75 | 22.3 |
| 428 (220) | 0.17 | 1.43 | 23.5 |

NOTE.—Each frying treatment time is 15 seconds. Water content in dried rice is 15.3%.

As shown in the above table, the swelling of rice is not sufficient when the frying temperature is under 302° F. (150° C.), and the same results of insufficient swelling with the drying of the surface part of the rice only are obtained at 302° F. (150° C.) (frying temperature) and this was true even though the frying time was increased to 3–5 minutes. Note further that, as the frying temperature increased higher, the virtual specific weight of rice become lowered, which means swelling of the rice has increased. The water content in the fried rice become smaller by dehydration and oil or fat content in the fried rice increases, which means that the finally produced instant cooking rice has an excellent taste and can be cooked in a relatively short time.

After the above-mentioned process and treatment, fried rice is ready for instant cooking. When a unit quantity of 120 grams of the fried rice is to be boiled for 3 minutes with 180 milliliters of water in a skillet or sauce pan, the resulting rice has an excellent taste, a glossy appearance and sufficient swelling without any hard core in the rice particles.

This invention will be better understood by the following non-limitative examples.

EXAMPLE I 2 kg. of raw rice is washed and dipped in water, and is boiled for 20 minutes under pressure of 3 kg./cm.² in a pressure kettle. After the boiling with pressure, the boiled rice is dried gradually by a hot-air drying device in which the air temperature is gradually increased from 86° F. (30° C.) to 194° F. (90° C.), resulting in the production of 1.5 kg. of dried rice with a water content of 15% based on the weight of the rice.

The dried rice is, further, fried for 15 seconds in a lard oil, heated at the temperature of 392° F. (200° C.), and 2.2 kg. of fried rice with optimum dehydration and swelling is obtained for instant cooking. The fried rice for instant cooking has 0.2 of virtual specific weight, 2.1% of water content, and 21.3% of oil or fat content.

When a unit quantity of 120 gram of the fried rice for instant cooking is boiled for 3 minutes with 180 milliliters of water, a boiled rice having excellent swelling characteristics without any hard core is ready to serve for a meal.

EXAMPLE II 2 kg. of raw rice is washed and dipped in water, and there is added 0.5% of glycerin-fat-acid-ester to the raw rice. The rice is then boiled for 20 minutes under a pressure of 2 kg./cm.$^2$ in a pressure kettle. After the boiling with pressure, the boiled rice is dried gradually by hot air in which the temperature is gradually increased from 86° F. (30° C.) to 194° F. (90° C.). 2.0 kg. of dried rice with a 12.8% water content is obtained. The dried rice is, further, fried for 10 seconds in a beef oil heated at 410° F. (210° C.). 2.4 kg. of fried rice is thus obtained, which has excellent dehydration and swelling characteristics and may be utilized for instant cooking.

The fried rice, obtained in the above procedure, has 0.18 of virtual specific weight, 1.8% of water content, and 24.3% of oil or fat content. When the fried rice for instant cooking is cooked in the same way explained in the above-mentioned Example I, a boiled rice having enough swelling without any hard core is ready to serve for a meal.

What is claimed is:

1. A method of producing fried rice for instant cooking comprising gradually drying boiled rice by heating it with hot air at a temperature between 86° F. and 194° F. until the water content of the rice is reduced to between 10–20%, dehydrating and swelling the rice by frying the dried rice for 10–20 seconds in oil heated to a temperature between 356°–428° F. thereby producing a fried rice product which may be prepared for consumption within a relatively short period of time.

2. A method according to claim 1 wherein the rice is initially boiled for about 20 minutes before the gradual drying step.

3. A method according to claim 2 wherein the rice is initially boiled under a pressure of 2 kg./cm.$^2$.

4. A method according to claim 2 wherein the rice is initially boiled under a pressure of 3 kg./cm.$^2$.

References Cited

UNITED STATES PATENTS

| | | | |
|---|---|---|---|
| 2,438,939 | 4/1948 | Ozai-Durrani | 99—80 |
| 2,903,360 | 9/1959 | Seltzer | 99—80 |
| 3,408,202 | 10/1968 | Serbia et al. | 99—80 |

OTHER REFERENCES

Lord "Everybody's Cookbook," Harcourt, Brace and Company, New York 1937, pp. 200–201.

RAYMOND N. JONES, Primary Examiner